US012702921B2

(12) United States Patent
Srivastava et al.

(10) Patent No.: US 12,702,921 B2
(45) Date of Patent: Aug. 11, 2026

(54) DECODING REGIONS OF INTEREST IN COMPUTER GAME VIDEO FIRST WHILE CONCEALING MISSING PARTS USING MULTIPLE DECODERS

(71) Applicant: Sony Interactive Entertainment Inc., Tokyo (JP)

(72) Inventors: Manoj Srivastava, San Mateo, CA (US); Eric Hsuming Chen, San Mateo, CA (US); Mario Sarria, San Mateo, CA (US); Hideyuki Mizusawa, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 268 days.

(21) Appl. No.: 18/481,968

(22) Filed: Oct. 5, 2023

(65) Prior Publication Data

US 2025/0114697 A1 Apr. 10, 2025

(51) Int. Cl.
*A63F 13/358* (2014.01)
*A63F 13/52* (2014.01)

(52) U.S. Cl.
CPC ............ *A63F 13/358* (2014.09); *A63F 13/52* (2014.09)

(58) Field of Classification Search
CPC ........ A63F 13/358; A63F 13/52; G06F 3/013; H04N 19/167; H04N 19/119; G06T 7/11
See application file for complete search history.

(56) References Cited

U.S. PATENT DOCUMENTS 10,255,714 B2 * 4/2019 Mitchell ................ G06F 3/013
10,360,732 B2 * 7/2019 Krishnaswamy ..... G06T 19/006
10,477,186 B2 * 11/2019 Sheridan ............. H04N 13/161
10,979,721 B2 * 4/2021 Atluru .................... G06V 20/41
11,025,918 B2 * 6/2021 Chen ......................... G06T 7/73
11,336,881 B2 * 5/2022 Cole ...................... H04N 19/37
2015/0341596 A1 * 11/2015 Noy ...................... H04N 7/152
348/14.09
2017/0078703 A1 * 3/2017 Ridge ................. H04N 19/184
2017/0094288 A1 * 3/2017 Hannuksela ......... H04N 19/187
2017/0236252 A1 * 8/2017 Nguyen ................ G06T 3/4092
345/419
2017/0316081 A1 * 11/2017 Kafai ................ G06F 16/24568
2018/0192058 A1 * 7/2018 Chen ....................... G06T 3/403
2018/0276841 A1 * 9/2018 Krishnaswamy ...... G06V 10/25
2020/0186831 A1 * 6/2020 Boyce ................. H04N 19/105
2021/0142520 A1 * 5/2021 Krishnan ................. G06T 5/70
2021/0192741 A1 * 6/2021 Rhodes .................. H04N 1/403
2021/0258457 A1 * 8/2021 Akkaya ................. G01S 17/894
2024/0223780 A1 * 7/2024 Kim .......................... G06T 7/11
2025/0114697 A1 * 4/2025 Srivistava ............ A63F 13/358

OTHER PUBLICATIONS

PCT Application No. PCT/US2024/049729, International Search Report and Written Opinion, Mailed On Feb. 12, 2025, 11 pages.
PCT Application No. PCT/US2024/049729, "Invitation to Pay Additional Fees and, Where Applicable, Protest Fee", Dec. 3, 2024, 2 pages.

* cited by examiner

*Primary Examiner* — Illiam H McCulloch, Jr.
(74) *Attorney, Agent, or Firm* — Kilpatrick Townsend & Stockton LLP

(57) ABSTRACT

Techniques are described for reducing latency in computer game network streaming by using plural encoders and decoders, with one encoder-decoder pair being used for regions of interest (ROI) in the video and being given priority in transmitting and rendering over background video that is processed by another encoder/decoder pair.

20 Claims, 8 Drawing Sheets

DECODING REGIONS OF INTEREST IN COMPUTER GAME VIDEO FIRST WHILE CONCEALING MISSING PARTS USING MULTIPLE DECODERS

FIELD

The present application relates to technically inventive, non-routine solutions that are necessarily rooted in computer technology and that produce concrete technical improvements, and more specifically to decoding regions of interest in computer game video first while concealing missing parts using multiple decoders.

BACKGROUND

Video such as computer simulation video such as computer game video may be streamed to end user terminals over a network.

SUMMARY

As understood herein, network conditions and/or regulatory-imposed network regulations regarding bandwidth limitations for energy saving may limit the network channel available to send a video such as a computer game video. As further understood herein, particularly in the case of computer gamers, latency is a principal concern under such conditions, because gamers prefer near-instantaneous reaction to their inputs, for example when shooting game weapons. Video quality may thus be less of a concern than delivering video with little to no latency.

Accordingly, an apparatus includes at least one processor assembly configured to encode a first portion of a video using a first encoder, encode a second portion of the video using a second encoder, ad send the first portion over a network to at least one receiver before sending the second portion such that the first portion is prioritized in transmission over the network.

In example embodiments the video can include a computer game video.

In some implementations the first portion may include a region of interest (ROI). The ROI may be identified using gaze tracking at the receiver, and/or by a source of the video, and/or by a machine learning (ML) model. If desired, the processor assembly can be configured to send to the receiver an indication of portions of the video that were not able to be encoded.

In another aspect, an apparatus includes at least one processor assembly configured to decode a first portion of a video using a first decoder, and decode a second portion of the video using a second decoder. The processor assembly is configured to present the first portion on at least one video display along with the second portion responsive to the second portion being available for display. Moreover, the processor assembly is configured to present the first portion on at least one video display without with the second portion responsive to the second portion not being available for display within a latency period.

In some examples, the processor assembly can be configured to, responsive to the second portion not being available for display within the latency period, reuse at least a portion of a previous frame in place of the second portion. In other examples, the processor assembly can be configured to, responsive to the second portion not being available for display within the latency period, obfuscate portions of the video surrounding the first portion. Yet again, the processor assembly may be configured to reconstruct the second portion responsive to the second portion not being available for display.

In another aspect, a method includes transmitting a region of interest (ROI) portion of a video frame to receiver before transmitting portions of the frame outside the ROI portion, and presenting the ROI portion on a video display regardless of whether portions of the frame outside the ROI region are decoded for presentation.

The details of the present disclosure, both as to its structure and operation, can be best understood in reference to the accompanying drawings, in which like reference numerals refer to like parts, and in which:

DETAILED DESCRIPTION

Figure 1:
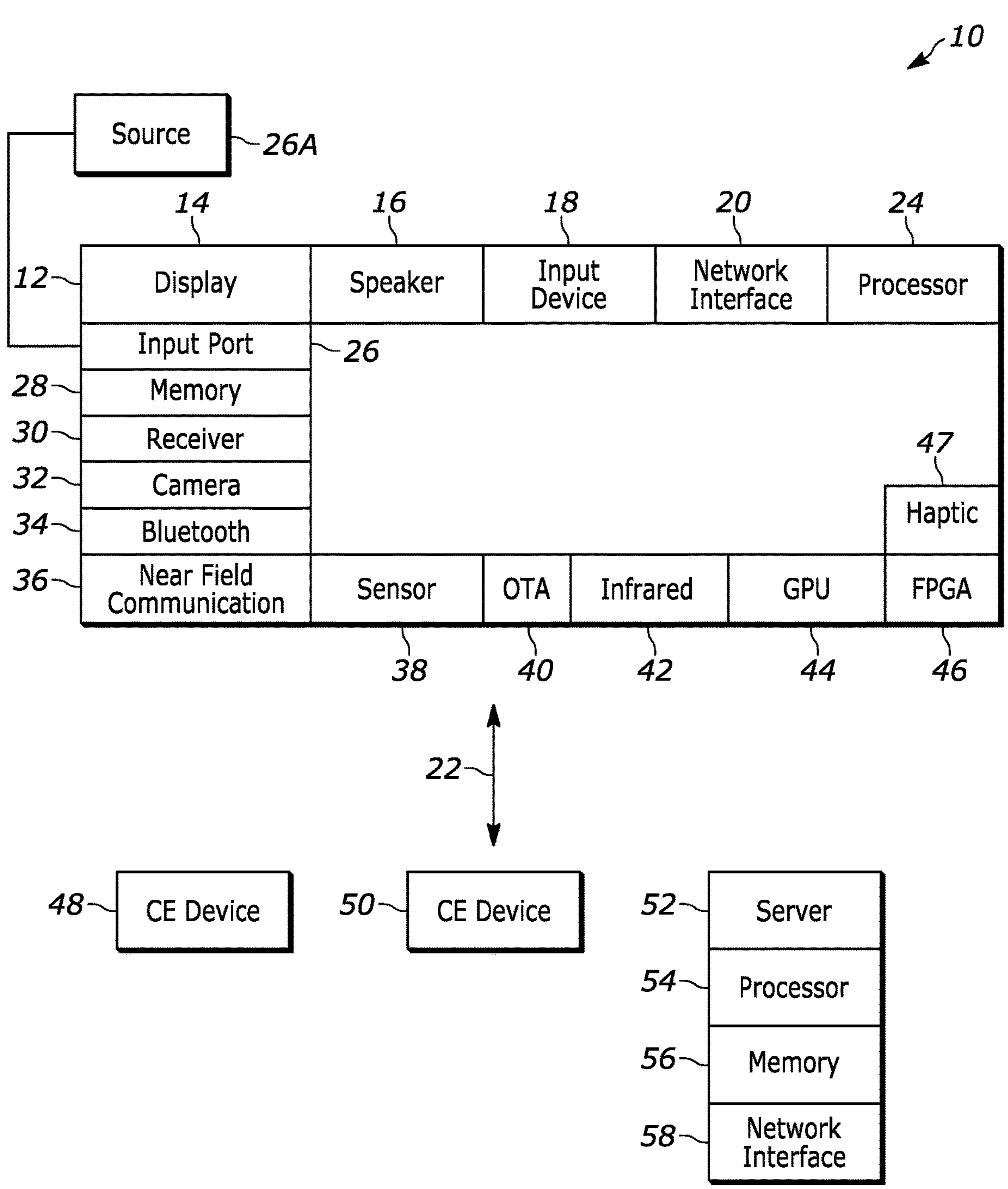
FIG. 1 is a block diagram of an example system including an example in consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
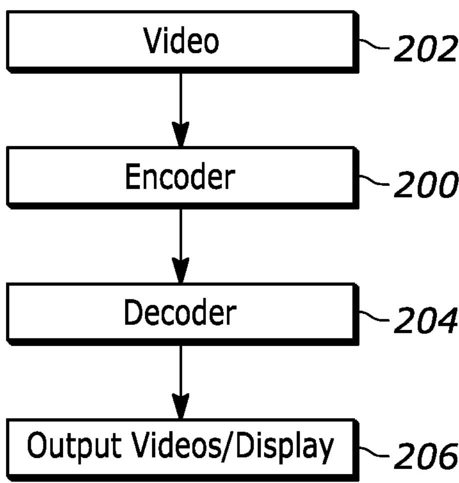
FIG. 2 illustrates an example encoder-decoder system.

FIG. 2 illustrates system that includes a video encoder 200 for encoding/compressing videos 202. A video decoder 204 can receive the encoded videos and decode/decompress them into output videos 206.

Figure 3:
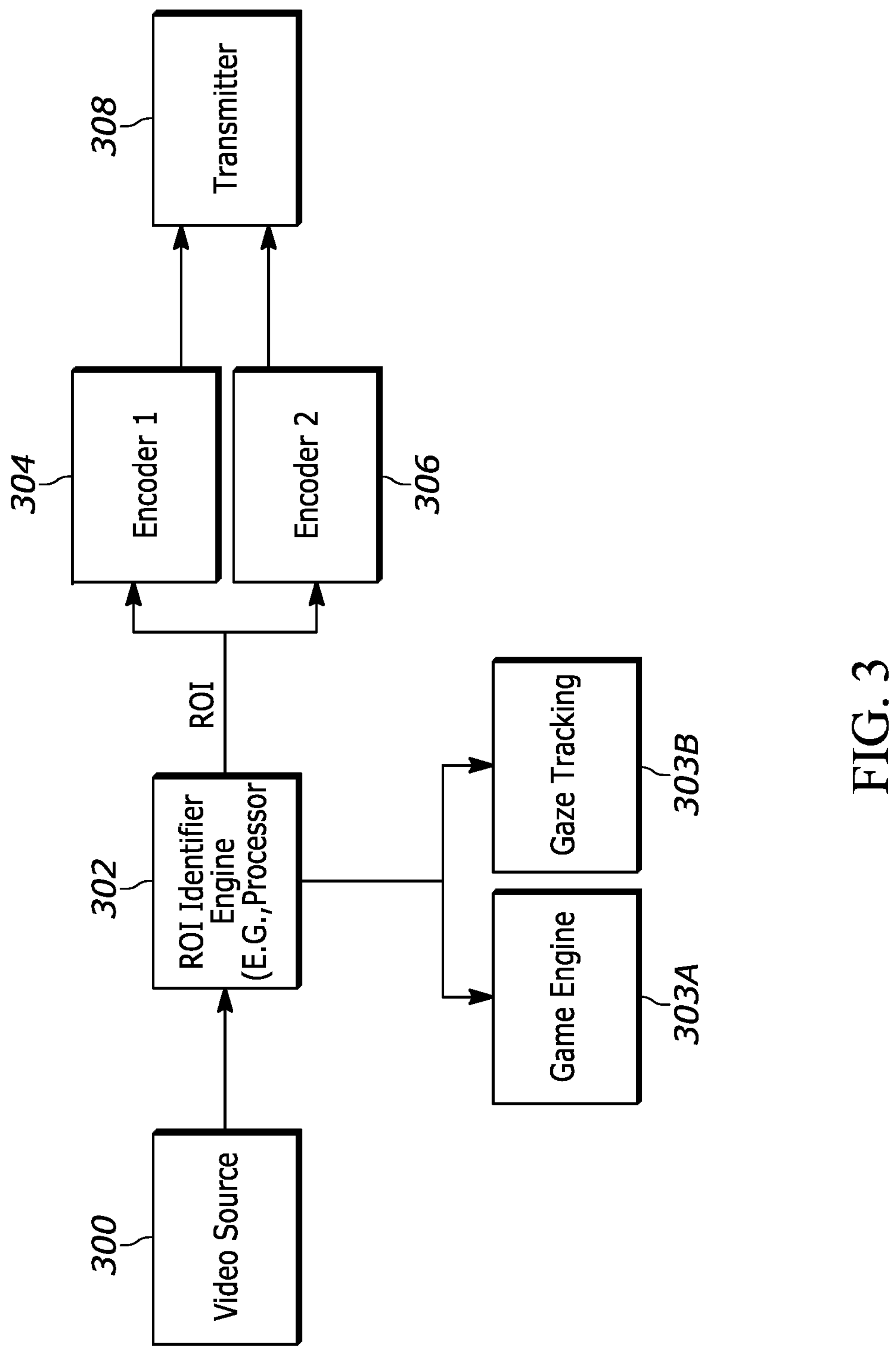
FIG. 3 illustrates an alternate example encoding system.

FIG. 3 illustrates another example encoder/transmitter system in which video such as computer simulation video such as computer game video is received from a source 300 of video, such as a game server or console. A region of interest (ROI) identifier engine 302 that may include one or more processors identifies a ROI in the video using various techniques described herein, including infusing information from a computer game engine 303A and/or using gaze tracking information 303B from the receiver end, e.g., from a head-mounted display camera or other gaze tracking camera.

The ROI portion of each video frame is encoded by a first encoder 304, whereas other portions of the frame outside the ROI are encoded by one or more other encoders 306. The encoded ROI portion is preferentially transmitted by a transmitter 308, e.g., over a computer network, to one or more receivers preferentially to transmitting the portions encoded by the one or more other encoders 306, such as by prioritizing transmission of the ROI of the frame over background portions of the frame. Note that non-ROI portions of a frame may be encoded with lower bit rate and/or frame rate and/or lower resolution than the rates/resolution at which the ROI is encoded.

Figure 4:
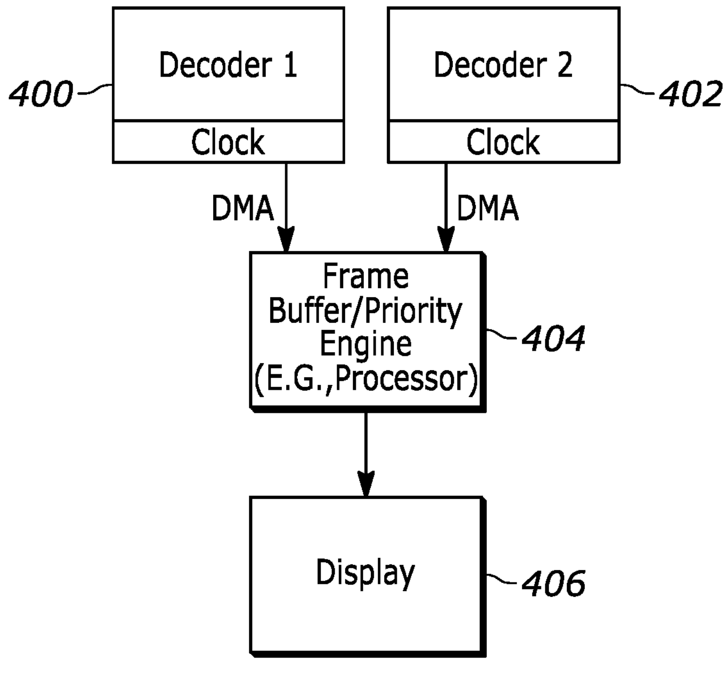
FIG. 4 illustrates an alternate example decoding system.

FIG. 4 illustrates a mirror receiver side decoding system that includes an ROI decoder 400 for decoding the ROI portion of each video frame and one or more other decoders 402 for decoding other portions of the frame outside the ROI. Each decoder may include its own independent clock, and the decoders may output their signals using direct memory access (DMA) to a frame buffer/priority engine 404 that may include storage and processing capability. The output of the frame buffer is presented on one or more video displays 406. Note that the decoders 400, 402 may be established as a decoder with separate cores 400, 402 with respective clocks to receive the streams and output a single frame buffer.

Figure 5:
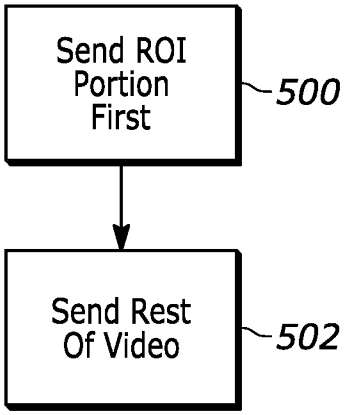
FIG. 5 illustrates example transmitter/encoder logic in example flow chart format.

FIG. 5 illustrates transmitter side logic. Commencing at state 500, the ROI portion of a frame is sent to the receiver prior to transmitting non-ROI portions, which are transmitted subsequently at state 502.

Figure 6:
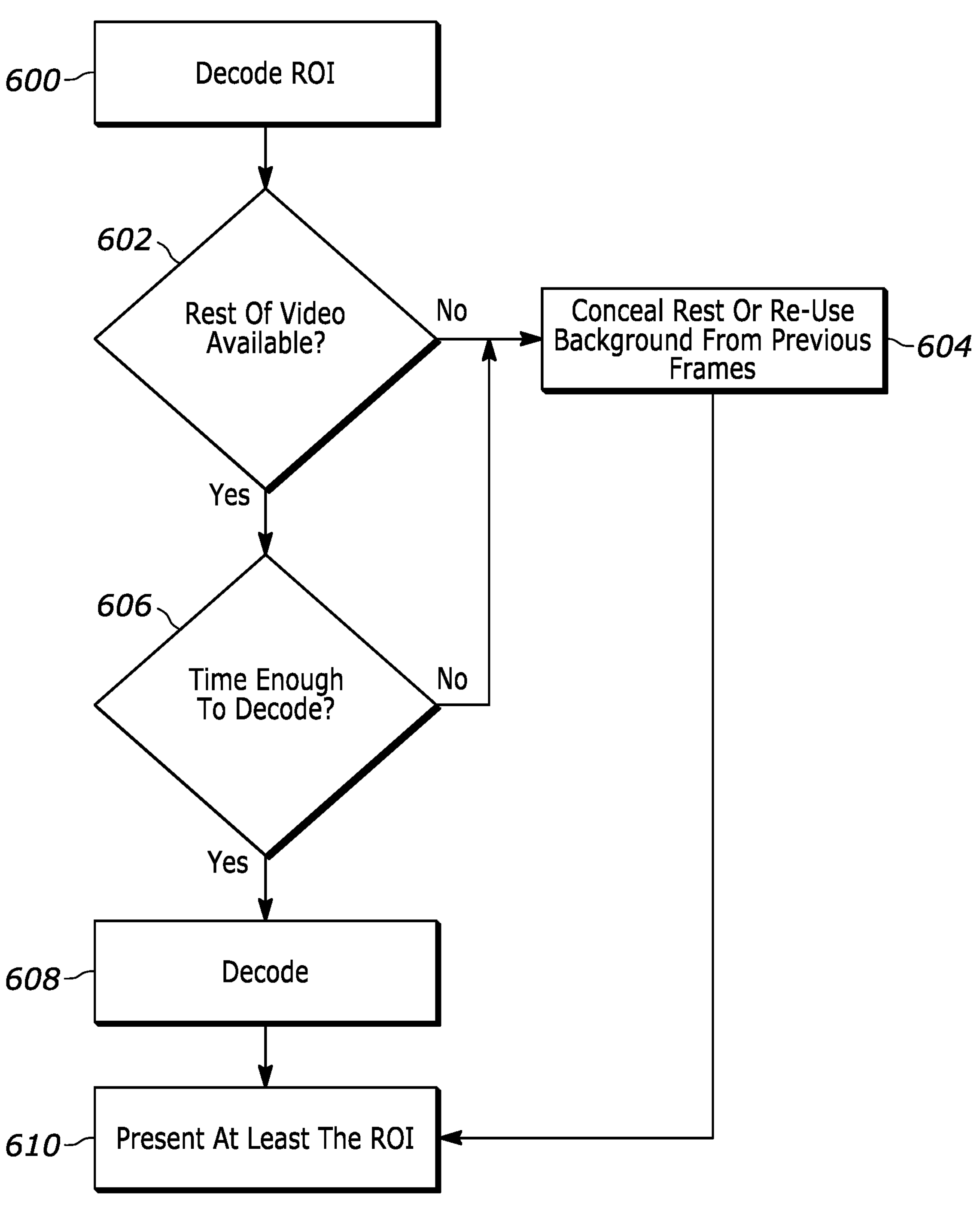
FIG. 6 illustrates example receiver/decoder logic in example flow chart format.

FIG. 6 illustrates receiver logic that is complementary to the transmitter logic. Commencing at state 600 the ROI portion of a received frame is decoded. State 602 indicates that if the non-ROI portion of the frame is not yet available, in the interest of minimizing latency the non-ROI portion of the frame is obfuscated/concealed, or non-ROI portions of previous frames are used with the current ROI and updated using motion vectors from the previous non-ROI portions, or the non-ROI portions are reconstructed by a ML model at state 604.

On the other hand, if the non-ROI portion of the frame is available, the logic may move from state 602 to state 606 to determine whether sufficient time exists to decode the non-ROI portion to present it with the ROI portion within latency constraints. That is, even if the non-ROI portion is available for decoding it may not be presented with the ROI of the frame if a predetermined latency requirement would not be met, in which case the logic flows from state 606 to state 602. However, if sufficient time exists to decode the non-ROI portion to present it with the ROI portion within latency constraints, the non-ROI portion is decoded at state 608 and the video frame is presented at state 610. Also, when the non-ROI portion of a frame cannot be presented with the ROI of the frame in time to meet latency requirements, the logic flows from state 604 to presentation state 610.

Figure 7:
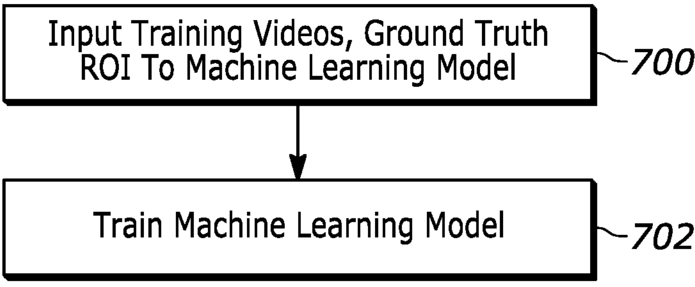
FIG. 7 illustrates example logic in example flow chart format for training a machine learning (ML) model to identify the region of interest (ROI) in a video.

FIG. 7 illustrates training logic for a ML model that may be used herein to identify the ROI of a frame of video. Block 700 indicates that a training set of data is input to the ML model to train the model at block 702. The training set may include frames of video along with ground truth indications of ROIs in those frames.

Figure 8:
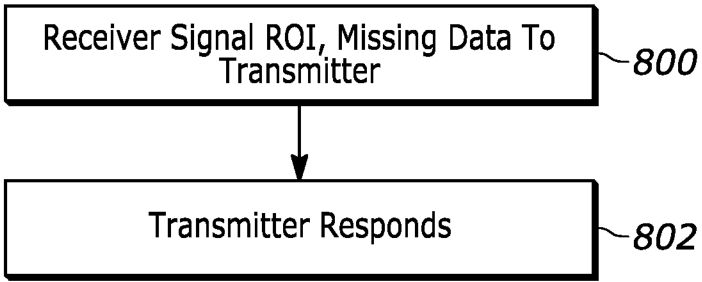
FIG. 8 illustrates additional example logic in example flow chart format for signaling missing frame parts.

FIG. 8 illustrates that the receiver/decoder may signal to the transmitter that any ROI and/or non-ROI data is missing from reception at state 800. At state 802 the transmitter may respond by re-transmitting the missing data and/or indicating how to reconstruct the missing data.

Figure 9:
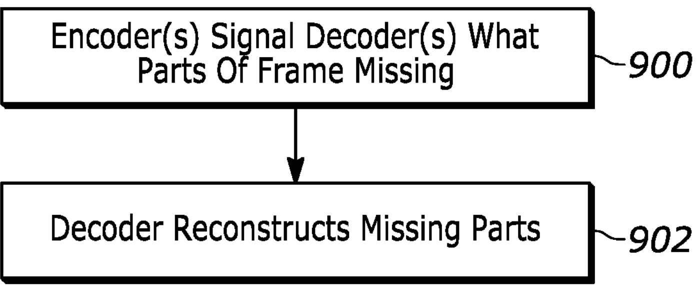
FIG. 9 illustrates additional example logic in example flow chart format for signaling missing frame parts.

In contrast, FIG. 9 illustrates that the transmitter/encoder may signal to the receiver at state 900 that portions of a video frame such as non-ROI portions have not yet been transmitted. This signal may accompany the ROI portion of the frame, so that the decoder may reconstruct the missing non-ROI portions at state 902 for presentation along with the ROI.

Figure 10:
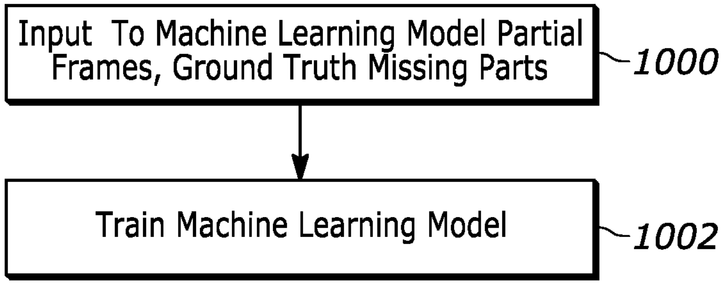
FIG. 10 illustrates example logic in example flow chart format for training a ML model to reconstruct missing portions of a video.

FIG. 9 may be accomplished using a ML model trained in accordance with FIG. 10. At state 1000 a training set of data is input to the ML model to train the model at state 1002. The training set may include partial video frames with ground truth indication of missing portions of the frames.

Figure 11:
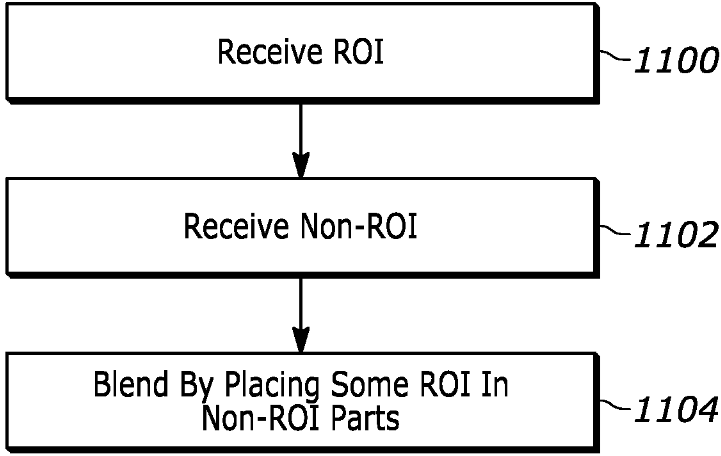
FIG. 11 illustrates example logic in example flow chart format for blending ROI portions of a video with non-ROI portions.

FIG. 11 illustrates a technique in which ROI parts of video frames can be stitched to respective non-ROI parts of the frames such that a non-ROI part can contain a small portion of the ROI for better blending. Commencing at state 1100, the ROI of a video frame is received. Moving to state 1102, the non-ROI portion of the frame is received. Then, at state 1104, the ROI is blended with the non-ROI portion by placing some portions of the ROI in the non-ROI parts.

Note that for implementations incorporating only a single decoder core to decode the entire frame, if non-ROI parts of a frame arrive too late within latency constraints, the ROI only is presented without the non-ROI parts, which may be discarded. Similarly, if gaze focus is used to ascertain ROI, if non-ROI portions of a frame do not arrive at the receiver within latency constraints, they may be discarded at such time as they do arrive, with the ROI being presented within the latency constraints. If the ROI is gaze-based, the receiver/decoder signals what the ROI is to the transmitter/encoder.

Present principles are advantageous for latency reduction and unstable network situations.

While particular techniques are herein shown and described in detail, it is to be understood that the subject matter which is encompassed by the present application is limited only by the claims.

What is claimed is:

1. An apparatus comprising:

at least one processor assembly configured to:

encode a first portion of a video using a first encoder of the at least one processor assembly, the first portion of the video including a region of interest (ROI) portion of the video;

concurrently encode a second portion of the video using a second encoder of the at least one processor assembly, the second portion of the video including a non-ROI portion of the video; and schedule transmission such that the encoded first portion is sent over a network to at least one receiver before sending the encoded second portion, the encoded first portion being prioritized in transmission over the network based on a latency target thereby facilitating:

responsive to the second portion being unavailable within the latency target and prior to presentation, update of a frame buffer to (i) obfuscate the second portion, (ii) reuse prior frame content, or (iii) reconstruct missing second portion content using a machine learning model; and responsive to the second portion becoming available, blending of the non-ROI portion with the ROI portion.

2. The apparatus of claim 1, wherein the video comprises a computer game video.

3. The apparatus of claim 1, wherein the ROI portion is identified using gaze tracking at the receiver.

4. The apparatus of claim 1, wherein the ROI portion is identified by a source of the video.

5. The apparatus of claim 1, wherein the ROI portion is identified with the machine learning model.

6. The apparatus of claim 1, wherein the processor assembly is configured to send to the receiver an indication of portions of the video that were not able to be encoded.

7. The apparatus of claim 1, wherein the at least one processor assembly is configured to transmit, with the first portion, an indication identifying non-ROI sub-regions not yet encoded and reconstruction instructions for use by the receiver during the latency target.

8. The apparatus of claim 1, wherein the at least one processor assembly is configured to adapt the ROI based on gaze tracking reported from the receiver and switches encoder assignment in real time without interrupting the scheduled transmission of the encoded first portion.

9. An apparatus comprising:
- at least one processor assembly including a frame buffer, the at least one processor assembly configured to:
  - decode a first portion of a video using a first decoder of the at least one processor assembly into the frame buffer, the first portion of the video including a region of interest (ROI) portion of the video;
  - concurrently decode a second portion of the video using a second decoder of the at least one processor assembly into the frame buffer, the second portion of the video including a non-ROI portion of the video;
  - present the decoded first portion on at least one video display while the second portion is being decoded;
  - responsive to the second portion being unavailable within a latency period and prior to presentation, update the frame buffer to (i) obfuscate the second portion, (ii) reuse prior frame content, or (iii) reconstruct missing second portion content using a machine learning model; and
  - responsive to the second portion becoming available, blending the non-ROI portion with the ROI portion.

10. The apparatus of claim 9, wherein the ROI portion is identified using gaze tracking.

11. The apparatus of claim 9, wherein the ROI portion is identified by a source of the video.

12. The apparatus of claim 9, wherein the ROI portion is identified with the machine learning model.

13. The apparatus of claim 9, wherein responsive to the latency period elapsing, the at least one processor assembly is configured to reuse non-ROI content from a previous frame updated by motion vectors while the ROI for a current frame is displayed.

14. The apparatus of claim 9, wherein responsive to the latency period elapsing, the at least one processor assembly is configured to a trained model to reconstruct missing second portion content and blends the reconstructed content with the decoded first portion content.

15. A method, comprising:
- transmitting a region of interest (ROI) portion of a video frame to a receiver before transmitting a portion of the frame outside the ROI portion;
- decoding the ROI portion of the video with a decoder of the receiver;
- presenting the ROI portion on a video display regardless of whether portions the portion of the frame outside the ROI portion is decoded for presentation;
- responsive to the portion of the frame outside the ROI portion being unavailable within a latency period and prior to presentation, updating a frame buffer to (i) obfuscate the portion of the frame outside the ROI portion, (ii) reuse prior frame content, or (iii) reconstruct missing portion of the frame outside the ROI portion using a machine learning model; and
- responsive to the portion of the frame outside the ROI portion becoming available, blending a non-ROI portion with the ROI portion.

16. The method of claim 15, comprising using plural encoders to encode the frame.

17. The method of claim 15, comprising using plural decoders to decode the frame.

18. The method of claim 15, comprising reconstructing the portion of the frame outside the ROI portion at the receiver using the machine learning model.

19. The method of claim 15, further comprising signaling, with the transmitted ROI portion, a mask identifying non-ROI areas to be concealed until corresponding data arrives or is reconstructed.

20. The method of claim 15, wherein the blending comprises placing portions of the ROI portion into adjacent non-ROI areas to improve visual continuity when the unavailable portions of the frame outside the ROI become available.

* * * * *